United States Patent
Collura et al.

(10) Patent No.: US 11,261,775 B2
(45) Date of Patent: Mar. 1, 2022

(54) REDUCTANT DOSING SYSTEM FOR AN SCR CATALYST

(71) Applicant: Liebherr-Components Colmar SAS, Colmar (FR)

(72) Inventors: Salvatore Collura, Luttenbach (FR); Thorben Phillip, Colmar (FR); Ghislain Peterschmitt, Colmar (FR)

(73) Assignee: Liebherr-Components Colmar SAS, Colmar (FR)

( * ) Notice: Subject to any disclaimer, the term of this patent is extended or adjusted under 35 U.S.C. 154(b) by 12 days.

(21) Appl. No.: 16/858,436

(22) Filed: Apr. 24, 2020

(65) Prior Publication Data

US 2020/0347765 A1 Nov. 5, 2020

(30) Foreign Application Priority Data

Apr. 26, 2019 (DE) .............. 10 2019 110 864.0

(51) Int. Cl.
 *F01N 3/20* (2006.01)
 *F01N 3/22* (2006.01)
 *F01N 3/32* (2006.01)

(52) U.S. Cl.
 CPC .............. *F01N 3/208* (2013.01); *F01N 3/222* (2013.01); *F01N 3/225* (2013.01); *F01N 3/32* (2013.01); *F01N 2260/024* (2013.01); *F01N 2390/02* (2013.01); *F01N 2560/06* (2013.01); *F01N 2560/08* (2013.01); *F01N 2610/02* (2013.01); *F01N 2610/085* (2013.01); *F01N 2610/11* (2013.01); *F01N 2610/142* (2013.01); *F01N 2610/144* (2013.01); *F01N 2610/1406* (2013.01); *F01N 2610/148* (2013.01); *F01N 2610/1473* (2013.01);
 (Continued)

(58) Field of Classification Search
 CPC ..... F01N 2610/1406; F01N 2610/1433; F01N 2610/144; F01N 2610/148; F01N 2900/1808; F01N 2900/1818
 See application file for complete search history.

(56) References Cited

U.S. PATENT DOCUMENTS

| 5,884,475 A | 3/1999 | Hofmann et al. |
| 7,021,047 B2 * | 4/2006 | Hilden ............... F01N 3/035 60/286 |

(Continued)

FOREIGN PATENT DOCUMENTS

| CN | 103511039 A | 1/2014 |
| CN | 105545422 A | 5/2016 |

(Continued)

OTHER PUBLICATIONS

Machine translation of JP-2008261247-A; accessed on Jun. 30, 2021. (Year: 2021).*

(Continued)

*Primary Examiner* — Jonathan R Matthias
(74) *Attorney, Agent, or Firm* — McCoy Russell LLP

(57) ABSTRACT

The present application provides a reductant dosing system for an SCR catalyst comprising an injector, a storage tank and a reductant pump arranged in a first fluid line between the storage tank and the injector for pumping reductant from the storage tank to the injector. The reductant dosing system comprises pressurizing means for pressurizing the storage tank.

21 Claims, 3 Drawing Sheets

(52) U.S. Cl.
CPC ............. *F01N 2610/1486* (2013.01); *F01N 2610/1493* (2013.01); *F01N 2900/1808* (2013.01); *F01N 2900/1811* (2013.01); *F01N 2900/1818* (2013.01)

(56) References Cited

U.S. PATENT DOCUMENTS

| 7,765,793 | B2 | 8/2010 | Nishiyama et al. | |
|---|---|---|---|---|
| 2005/0207936 | A1* | 9/2005 | Berryhill | F02D 41/0235 |
| | | | | 422/63 |
| 2012/0279576 | A1* | 11/2012 | Hennecke | F01N 3/206 |
| | | | | 137/1 |
| 2015/0283505 | A1* | 10/2015 | Brooks | B01D 53/9409 |
| | | | | 252/182.34 |
| 2015/0283508 | A1* | 10/2015 | Nelson | F01N 3/2066 |
| | | | | 423/212 |
| 2018/0073407 | A1 | 3/2018 | Hogan et al. | |

FOREIGN PATENT DOCUMENTS

| CN | 105626204 | A | | 6/2016 | |
|---|---|---|---|---|---|
| CN | 107687358 | A | | 2/2018 | |
| DE | 102008001092 | A1 | | 11/2008 | |
| DE | 102010005406 | A1 | | 7/2011 | |
| EP | 0839264 | B1 | | 12/1999 | |
| EP | 2192280 | A1 | | 6/2010 | |
| JP | 2008261247 | A | * | 10/2008 | ........... F01N 3/2066 |
| WO | 0018491 | A1 | | 4/2000 | |
| WO | 2008080695 | A1 | | 7/2008 | |

OTHER PUBLICATIONS

Lee, S. et al., "Experimental Study on the Characteristics of Nano-Particle Emissions From a Heavy-Duty Diesel Engine Using a Urea-SCR System," International Journal of Automotive Technology, vol. 13, No. 3, Mar. 22, 2012, 9 pages.

European Patent Office, Extended European Search Report Issued in Application No. 20171339.3, dated Sep. 18, 2020, Germany, 12 pages.

* cited by examiner

REDUCTANT DOSING SYSTEM FOR AN SCR CATALYST

CROSS-REFERENCE TO RELATED APPLICATION

The present application claims priority to German Patent Application No. 10 2019 110 864.0 filed on Apr. 26, 2019. The entire contents of the above-listed application is hereby incorporated by reference for all purposes.

TECHNICAL FIELD

The present invention is directed to a reductant dosing system for an SCR catalyst.

BACKGROUND AND SUMMARY

Selective Catalytic Reduction (SCR) is used for reducing NOx emissions from internal combustion engines, with the SCR catalyst being part of an exhaust gas aftertreatment system of the engine.

Reductant dosing systems for an SCR catalyst usually include at least a storage tank for the reductant, usually a urea solution, a pump to pressurize the reductant and one or more injectors to precisely meter the reductant. Further, a reductant filter may be provided to prevent damage to the injector.

A first type of injectors uses pressurized air mixed with the reductant in the injector for spraying the reductant into the exhaust gas stream. In an airless type injector, in contrast, the spray is only generated by the fluid pressure of the reductant.

U.S. Pat. No. 7,765,793 B2 shows a dosing system where pressurized air from the supercharger of the engine is used for spraying the reductant into the exhaust gas passage as an air-reductant mixture.

US 2018/0073407 A1 shows a dosing system which uses, instead of a fluid pump, pressurized air from the supercharger of the engine for pressurizing the reductant. The pressurized air is introduced into the reductant storage tank and drives the reductant to the injector.

In order to be able to introduce the reducing agent into the exhaust stream in an optimal way, the injector must be positioned directly on the hot exhaust pipe. To avoid severe damage to the injector and ageing of the reductant, the temperature of the injector must not exceed a certain level during operation.

This temperature is controlled either using an air cooling system mounted on the injector body [EP 2126302 B1], engine coolant [EP 2192280 B 1] or directly by the reductant [EP 1117469 B1]. The two first methods are not really suitable for large off-road vehicles and therefore the reductant cooling system is often preferred.

The present invention is directed to providing an improved dosing system for an SCR catalyst.

This object is solved by a dosing system according to claim 1.

The present invention provides a dosing system for an SCR catalyst comprising an injector, a storage tank and a reductant pump arranged in a first fluid line between the storage tank and the injector for pumping reductant from the storage tank to the injector. The inventive SCR reductant dosing system further comprises pressurizing means for pressurizing the storage tank.

The inventors of the present invention have realized that normal dosing systems cannot be used at high altitude, because usual reductant pump are not able to operate at low atmospheric pressure. By providing the pressurizing means in addition to the reductant pump, the dosing system of the present invention is able to work also at high altitude. Further, in possible embodiments, the pressurizing means may avoid system failure when the reductant filter starts to clog or when the reductant temperature is higher than a desired temperature.

In an embodiment of the present invention, the reductant pump is configured to cool the injector by generating a reductant flow through the injector, wherein a first part of the reductant flow is injected by the injector into the exhaust gas stream and a second part of the reductant flow is flowing back via a second fluid line to the storage tank and/or a suction side of the reductant pump, wherein the second fluid line preferably comprises a cooler. Such cooling systems are known per se. The inventors of the present invention have however realized that pressurizing means can be used to improve the performance of such a system.

In an embodiment of the present invention, the reductant dosing system comprises a pressure sensor for sensing a pressure in the storage tank and a control system for controlling the pressurizing means in dependence on a pressure measured by the pressure sensor.

A control of the pressurizing means by the control system of the present invention in dependence on a pressure measured by the pressure sensor may in particular involve a control of a pressure generated by the pressurizing means and/or of a connection between a pressure generator of the pressurizing means and the storage tank in dependence on a pressure measured by the pressure sensor.

In an embodiment of the present invention, the reductant dosing system is configured to maintain an absolute pressure in the storage tank of between 0.5 bar and 2 bar, preferably between 0.8 bar and 1.5 bar, more preferably between 0.9 bar and 1.2 bar.

In particular, the control system may be configured to control the pressurizing means for maintaining a pressure inside the storage tank between 0.5 bar and 2 bar, preferably between 0.8 bar and 1.5 bar, more preferably between 0.9 bar and 1.2 bar.

The reductant pump can therefore operate even at high altitude in the same way as at lower altitude, because the pressure inside the storage tank is maintained at a value close to an atmospheric pressure value present at lower altitude.

In an embodiment of the present invention, the reductant dosing system comprises a temperature sensor for sensing a temperature of the reductant stored in the storage tank and a control system for controlling the pressurizing means in dependence on a temperature measured by the temperature sensor. The inventors of the present invention have realized that the pressure necessary at the suction side of a pump necessary to avoid cavitation depends on the temperature of the reductant. Therefore, the signal from the pressure sensor may be used to adjust a desired pressure value used for controlling the pressurizing means.

A control of the pressurizing means by the control system of the present invention in dependence on a temperature measured by the temperature sensor may involve a control of a pressure generated by the pressurizing means and/or of a connection between a pressure generator of the pressurizing means and the storage tank in dependence on a temperature measured by the temperature sensor. Controlling the pressure generated by the pressurizing means may include switching the pressurizing means on and off.

In an embodiment of the present invention, the reductant dosing system comprises a quality sensor for sensing a urea concentration of the reductant stored in the storage tank and a control system for controlling the pressurizing means in dependence on the urea concentration measured by the sensor.

The inventors of the present invention have realized that the pressure necessary at the suction side of a pump necessary to avoid cavitation depends on the urea concentration of the reductant. Therefore, the signal from the quality sensor may be used to adjust a desired pressure value used for controlling the pressurizing means.

A control of the pressurizing means by the control system of the present invention in dependence on a urea concentration measured by the quality sensor may involve a control of a pressure generated by the pressurizing means and/or of a connection between a pressure generator of the pressurizing means and the storage tank in dependence on a urea concentration measured by the quality sensor. Controlling the pressure generated by the pressurizing means may include switching the pressurizing means on and off.

In an embodiment of the present invention, the reductant dosing system comprises a control system for varying a pressure threshold used for controlling the pressurizing means in dependence on a temperature and/or a urea concentration of the reductant.

In particular, the pressurizing means may be activated by the control system if the pressure inside the storage tank and/or atmospheric pressure raises above the pressure threshold. Activating the pressurizing means may comprise activating a pressure generator of the pressurizing means and/or opening a connection between a pressure generator of the pressurizing means and the storage tank.

Preferably, the pressure threshold is increased with an increase in urea concentration and decreased with an increase in temperature.

In an embodiment of the present invention, the reductant dosing system comprises a position sensor for determining an altitude of the vehicle in which the reductant dosing system is used and a control system for controlling the pressurizing means in dependence on the altitude determined by the position sensor.

In an embodiment of the present invention, the pressurizing means comprises an air supply device configured to supply pressurized air to the storage tank as a pressure generator.

In an embodiment of the present invention, the storage tank may comprise an air inlet arranged above the fluid level of the reductant that is connected to the pressurizing means.

In an embodiment of the present invention, the pressurizing means comprises a pressure generator driven by a motor drive. In particular, the pressurizing means may comprise a compressor, a turbocharger and/or an air klaxon. In an embodiment, the control system may control the pressurizing means and in particular the pressure generated by the pressurizing means by controlling the motor drive.

In an embodiment of the present invention, the pressurizing means comprises a valve arranged in a line connecting the storage tank with a pressure generator of the pressurizing means. In particular, the valve may be a two-way-valve, a three-way-valve and/or a pressure control valve. In an embodiment, the control system may control the pressurizing means and in particular the pressure inside the storage tank by controlling the valve.

In an embodiment of the present invention, the pressurizing means comprises a valve for selectively connecting the storage tank with a pressure generator of the pressurizing means and atmosphere.

In an embodiment of the present invention, the reductant dosing system comprises a control system for controlling the valve in dependence on at least one operating parameter, in particular a temperature and/or pressure and/or urea concentration inside the storage tank.

In particular, the control system may be configured to connect the storage tank with the pressurizing means if a temperature and/or pressure and/or urea concentration inside the storage tank is outside of an allowed range. In particular, the control system may be configured to connect the storage tank with the pressure generator of the pressurizing means if a temperature inside the storage tank is higher than a temperature threshold and/or if a pressure inside the storage tank is below a pressure threshold and/or if a urea concentration is above a concentration threshold.

In an embodiment of the present invention, the reductant dosing system is configured for purging the dosing system on shut-off of the engine and for refilling the dosing system on start of the engine. By purging the system, damage on freezing of the reductant can be avoided. The pressurizing means will then avoid cavitation on refilling of the system. The purging of the system preferably comprises filling the first fluid line between the storage tank and the injector, the injector and/or the second fluid line from the injector at least partly with air. The purging is preferably done by operating the reductant pump in a reverse direction.

In a first embodiment of the present invention, the injector comprises an inlet for pressurized air, the air being used for mixing with the reductant and spraying the reductant into the exhaust has stream. In such an embodiment, the pressurizing means can also be used for providing pressurized air to the injector.

In a second embodiment of the present invention, the injector is of the airless type. In such an airless type injector, the reductant is injected into the exhaust has stream only by the fluid pressure of the reductant pumped to the injector and without mixing of the reductant with pressurized air. Such an airless type injector is therefore not equipped with an inlet for pressurized air.

The present invention further comprises a combustion engine comprising an exhaust gas aftertreatment system having an reductant dosing system as described above.

The present invention further comprises a mobile machine comprising a combustion engine as described above.

In an embodiment of the present invention, the mobile machine comprises a compressor for providing pressurized air to a functional element of the mobile machine, in particular to a horn and/or a braking system, and the compressor is used as the pressure generator of the pressurizing means for the reductant dosing system. Thereby, existing components can be used for implementing the present invention.

In an embodiment of the present invention, the mobile machine is an earth moving machine, in particular a dumper truck or an excavator. The present invention can however also be used in any other application.

BRIEF DESCRIPTION OF THE FIGURES

The present invention will now be described with reference to embodiments and drawings.

DETAILED DESCRIPTION

Selective Catalytic Reduction (SCR) Exhaust Aftertreatment Systems (EATS) are a key technology for reducing NOx emissions from internal combustion engines.

Figure 1:
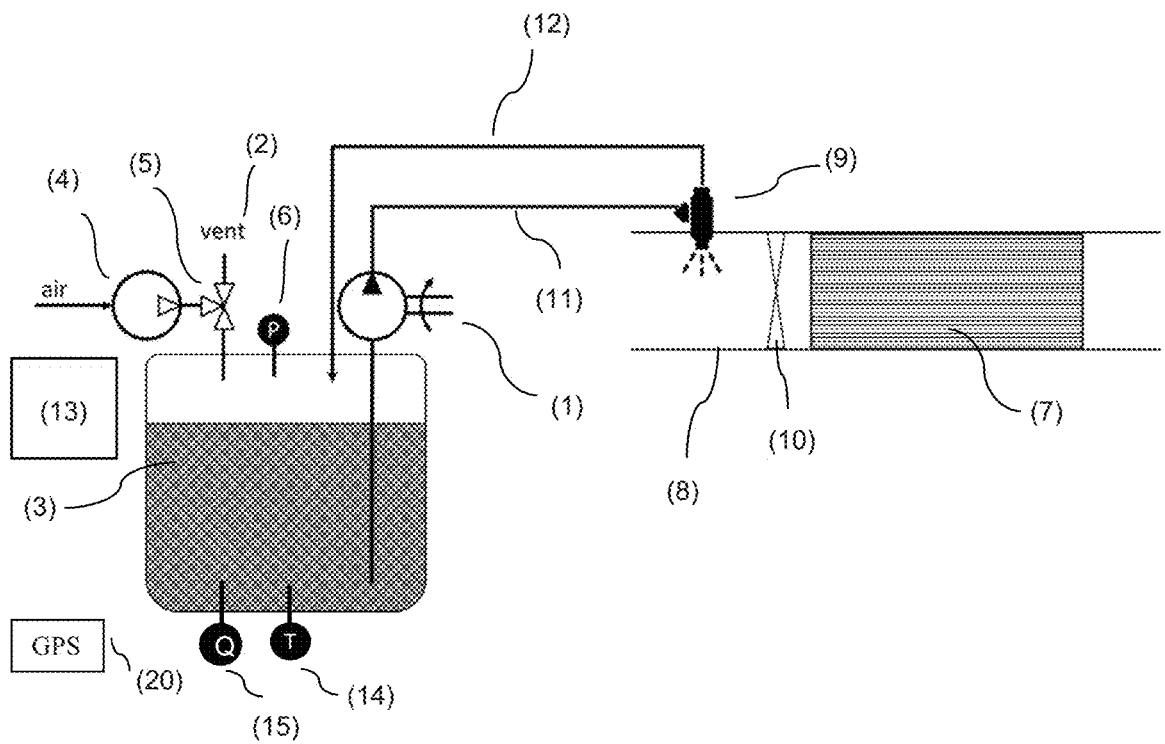
FIG. 1: a schematic drawing showing elements of an embodiment of a dosing system according to the present invention.

An SCR EATS according to the present invention is shown in FIG. 1 and includes at least a storage tank 3 for the reductant, in particular a urea solution, a reductant pump 1 to pressurize the reductant and one or more injectors 9 to precisely meter the reductant. The reductant will also be referred to as Diesel Exhaust Fluid (DEF) in the following. The injectors 9 are mounted on the exhaust piping 8 in front of a mixing element/chamber 10 and a SCR element 7. In the embodiment, the injectors 9 are of the airless type.

The reductant pump 1 is arranged in a first fluid line 11 between the storage tank 3 and the injector 9 for pumping reductant from the storage tank 3 to the injector 9. Further, a filter (not shown) may be provided in the first fluid line 11 to prevent damage to the injection system. In such system the reductant solution is used to reduce the NOx emissions and to control the temperature of the injectors (9) mounted on the exhaust pipe (8).

In order to be able to introduce the reducing agent into the exhaust stream in an optimal way, the injector must be positioned directly on the hot exhaust pipe 8. To avoid severe damage to the injector and ageing of the reductant, the temperature of the injector must not exceed a certain level during operation. This temperature is controlled either using air cooling system mounted on the injector body, engine coolant or directly the reductant. In the embodiment shown in FIG. 1, the cooling is done via the reductant pumped by reductant pump 1 via the first fluid line 11 to the injector, where part of the reductant is injected into the exhaust has stream, and part of the reductant flows back via the second fluid line 12 to the tank 3.

Because the reductant will usually freeze below a certain temperature, such as −11° C., and the freezing reductant expands, it may cause permanent damage to the dosing system without counter-measures. In order to avoid such issue, the dosing system is configured such that it is automatically purged when the machine is turned off and then refilled when the machine is turned on. For this purpose, the pump 1 is arranged at a level above tank 3, such that the reductant will flow back from the pump to the tank during the purging process by gravity. After purging, the fluid lines 11 and 12 that are not immersed in the reductant stored in the tank 3, the injector 9 and the pump 1 are filled with air. For purging of the reductant lines and the injector, the reductant pump 1 may be controlled by an electronic control unit (ECU) 13 to operate in a reverse direction. The reductant pump 1 may e.g. be a gear pump.

When the engine is turned on again, the dosing system is filled with reductant from the tank 3 by operating the pump 1 in the forward direction. To fill up the dosing system, it is very important to respect the pump Net Positive Suction Head Requirement (NPSHr), which is the minimum pressure required at the suction port of the pump to keep the pump from cavitating. Therefore, the absolute pressure at the suction port of the pump (NPSHa) must be greater than NPSHr for the pump system to operate without cavitating.

Apart from the pressure at the suction port of the pump, the temperature of the reductant plays a role. The impact of the reductant (DEF) temperature and the altitude on the NPSHa is illustrated by the following formula:

$$NPSHa = Ha - Hz - Hf - Hvp$$

| Term | Definition | Unit | Comment |
| --- | --- | --- | --- |
| NPSHa | The absolute pressure at the suction part of the pump | m | This value must always be higher than the NPSHr of the pump. |
| Ha | The absolute pressure on the surface of the DEF in the supply tank | m | On vented supply tank, it is the atmospheric pressure. Altitude affect the atomospheric pressure. |
| Hz | The vertical distance between the surface of the DEF in the supply tank and the centerline of the pump | m | In our installation, the pump must be higher than the maximum DEF level in order to be emptied when purged. That is why, here we only consider a negative effect of Hz. |
| Hf | The friction losses in the piping | m | This value represents the pressure losses due to the piping and filters between the DEF in the supply tank and the pump. |
| Hvp | The absolute vapor pressure of the DEF at the pumping temperature | m | It is important to bear in mind that the vapor pressure increases as the temperature increases, thus reducing the NPSHa. |

Figure 4:
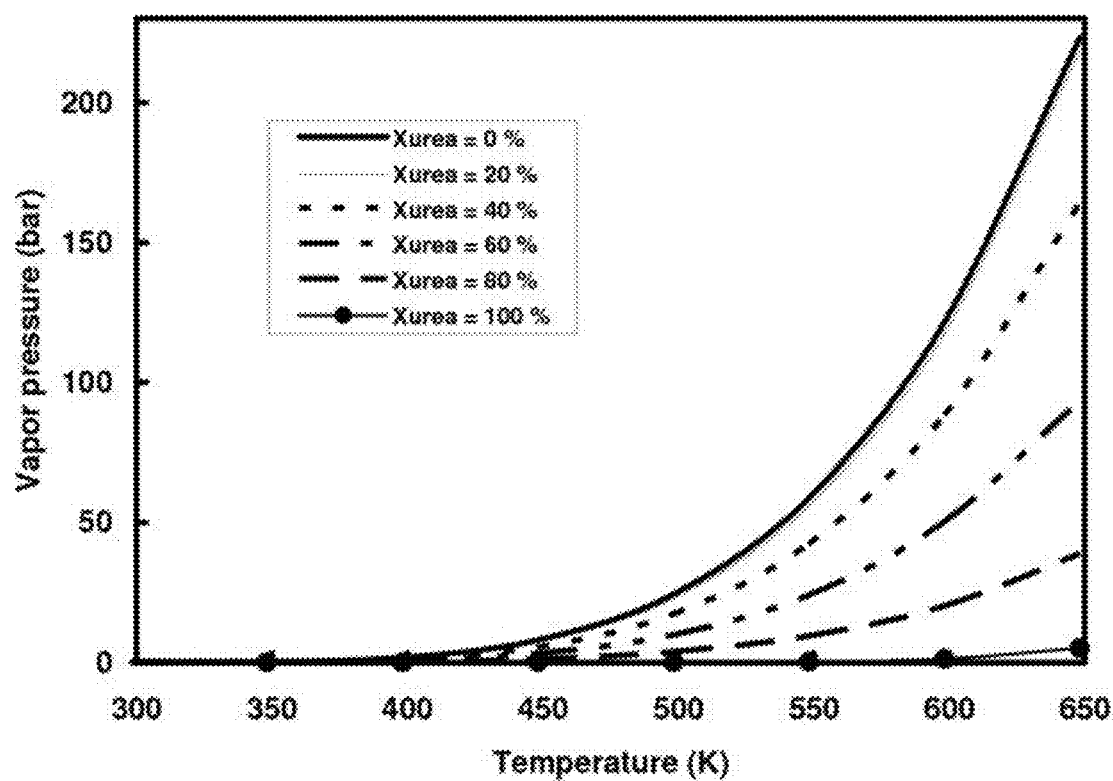
FIG. 4: a diagram showing the dependency of the absolute vapour pressure Hvp on the reductant temperature for different urea concentrations of the reductant.

As atmospheric pressure is decreased at higher altitudes, the NPSHa reduces. In a similar way, when the DEF temperature increases over running time, the NPSHa drops. Further, as illustrated in FIG. 4, the absolute vapour pressure Hvp also depends on the urea concentration of the reductant, and will drop with increasing urea concentration.

If the NPSHa goes below the NPSHr, the pump will start cavitating, which would then lead to a pump failure. If such issue happens, the NOx emissions will not be reduced and the DEF injectors will get damaged.

Pump cavitation is avoided according to the present invention by increasing the NPSHa at the suction port of the pump by increasing the absolute air pressure inside the storage tank 3. Thereby, even at high altitudes, the injectors 9 are protected from overheating and a similar exhaust gas aftertreatment efficiency is provided as at lower altitudes. Therefore, in the embodiment, pressurized air is used to improve the performance of the reductant injection system and allow the system to perform in conditions where it would not have been able to function.

Figure 2:
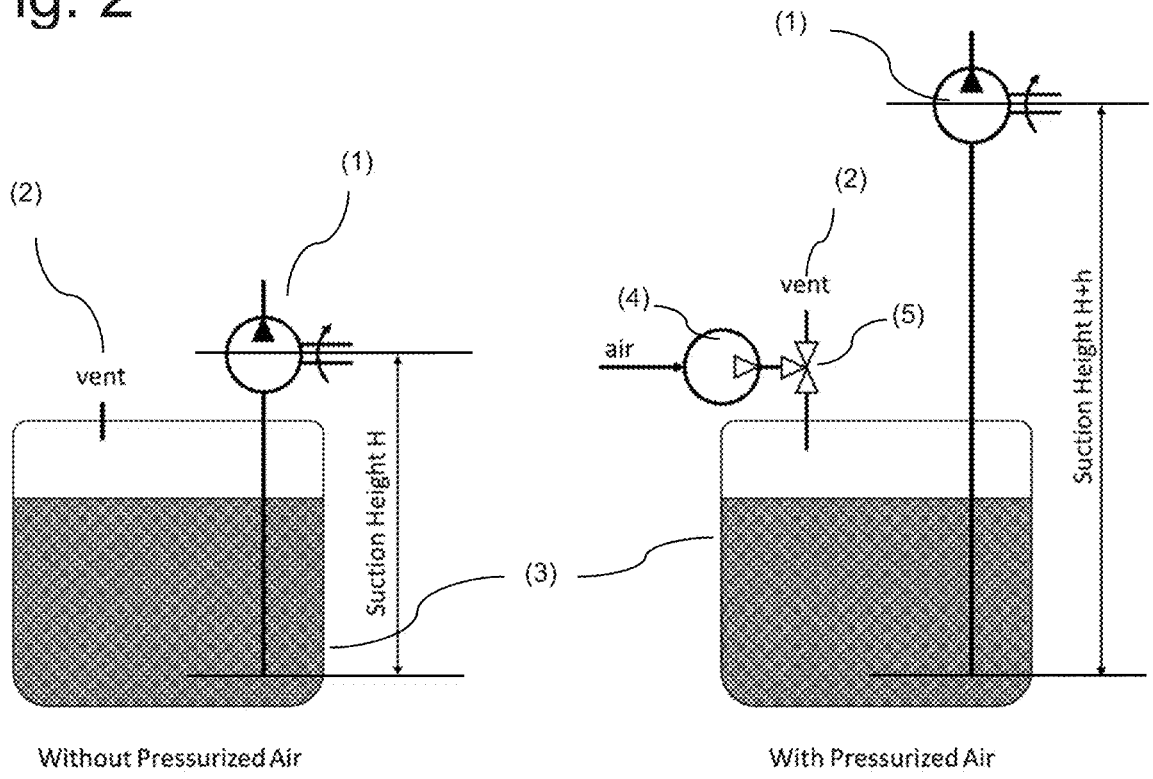
FIG. 2: a comparison between a comparative embodiment and the embodiment of the present invention regarding suction height
Figure 3:
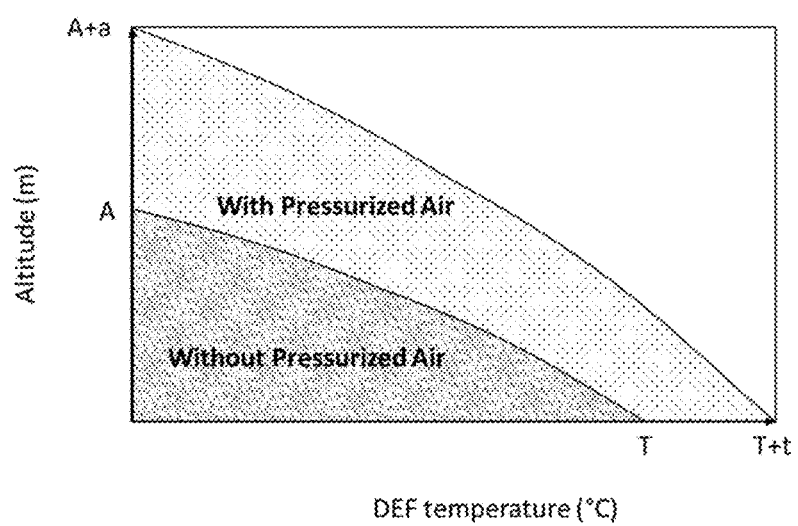
FIG. 3: a diagram showing the working ranges of a comparative embodiment and the embodiment of the present invention regarding altitude and reductant temperature.

Such conditions are illustrated by the FIG. 2 and the FIG. 3. In particular, FIG. 2 shows that the suction height of a standard dosing system, such as shown on the left hand side, can be increased by pressurizing the storage tank 3. Further, FIG. 3 shows that pressurizing the storage tank 3 allows to operate the dosing system at higher altitude and/or higher temperatures. Therefore, the SCR dosing system of the present invention can used to lift up the reductant at a higher height that the standard reductant dosing system would be able to and/or could be used at higher altitude and/or with higher reductant temperature that it was first designed for.

The embodiment of the present invention represented in FIG. 1 comprises a reductant dosing system having, in addition to injectors 9, a reductant pump 1 and a reductant storage tank 3, a pressure sensor 6 to measure pressure inside the storage tank 3 and a pressurizing means comprising an air supply device 4 to pressurize the storage tank 3.

Further, an electronic control unit (ECU) 13 is provided. The ECU may comprise a microcontroller and program code stored in memory, the program code comprising instructions for performing the control steps as further described in this document. The ECU is configured to read a signal from the pressure sensor 6 and to control the pressurizing means in dependence on the pressure measured by the pressure sensor 6. Controlling the pressurizing means may include controlling the air supply device and/or a fluid connection between the air supply device and the storage tank 3.

Alternatively or in addition, the ECU may be configured to read a signal from a position sensor 20 such as a GPS sensor and to control the pressurizing means in dependence on the altitude determined on the basis of the position sensor 20. Controlling the pressurizing means may include controlling the air supply device and/or a fluid connection between the air supply device and the storage tank 3. In particular, a vehicle position signal may be used to determine the altitude and then trigger the pressurized air according to the altitude signal.

The position signal may be used to switch on and off an operation mode where the pressurizing means is controlled in dependence on the pressure measured by the pressure sensor 6. Alternatively, the position signal may be used to calculate an ambient air pressure value that replace the signal from the pressure sensor.

Further, in an embodiment, a temperature sensor 14 may be provided for measuring the temperature of the reductant inside the storage tank 3. The ECU is configured to read a signal from the temperature sensor 14 and to control the pressurizing means in dependence on the temperature measured by the temperature sensor 14.

Further, in an embodiment, a quality sensor 15 may be provided for measuring the urea concentration of the reductant inside the storage tank 3. The ECU is configured to read a signal from the quality sensor 15 and to control the pressurizing means in dependence on the urea concentration measured by the quality sensor 15.

In an embodiment, the temperature sensor 14 and the quality sensor 15 may be integrated in a suction module that also includes a suction line of the pump 1.

For the air supply device 4, any device allowing to deliver enough air to increase and/or regulate the pressure seen by the pressure sensor 6 at around 1 atmosphere can be used. For example, the air supply device 4 may be an air compressor 4. Further, a turbocharger or an air klaxon could be used instead of the air compressor 4.

In the embodiment shown in FIG. 1, the air compressor 4 and a vent 2 are selectively connectable to the storage tank 3 via a three way valve 5. In an alternative embodiment, the air compressor 4 is directly connected to the storage tank 3, for example via an on/off valve or a pressure control valve. The ECU 13 is configured to control the valve 5 as part of the control of the pressurizing means.

Two embodiments are described in the following regarding the use and/or configuration of the dosing system:

The dosing system may be delivered as a high altitude kit when customers require clean machine at high altitude. In that case, the three way valve 5 is not necessary and the vent 2 may be directly replaced by the air supply device 4. In such example, the absolute pressure on the surface of the reductant in the supply tank Ha could be maintained approximately at 1 bar absolute pressure in order to have the same performance at high altitude than at sea level.

In particular, the ECU may be configured to provide pressurized air from the air supply device 4 when the pressure inside the storage tank falls below a first pressure threshold, and to stop the supply of pressurized air when the pressure inside the storage tank rises above a second, higher pressure threshold. The first pressure threshold may be an absolute pressure between 0.5 bar and 1.2 bar, preferably between 0.8 bar and 1.0 bar. The second pressure threshold may be an absolute pressure between 0.8 bar and 1.5 bar, preferably between 1.0 bar and 1.2 bar.

The dosing system could be delivered as an anti-cavitation kit for the reductant pump 1. Here the three way valve 5 would be directed to the vent 2 until a cavitation risk is calculated/detected by the ECU. When a cavitation risk is flagged, the three way valve 5 would be switched to the air supply device 4 and the pressure increased and regulated to a value determined by the ECU and measured by the pressure sensor 6. For example, the cavitation risk could be due to a reductant filter being clogged or to the reductant temperature inside the reductant tank being higher than the designed temperature. For this purpose, the ECU may evaluate the temperature of the reductant via the temperature sensor 14 and/or the urea concentration via the quality sensor 15 and determine at least one pressure threshold for controlling the air supply device 4. In particular, the ECU may be provided with a look-up table for determining the at least one pressure threshold.

In particular, the ECU may be configured to use a pressure threshold that increases with increasing urea concentration and/or decreases with increasing temperature.

In an embodiment, the ECU is configured to determine the first and/or second pressure threshold for the operation described above with respect to the first embodiment based on a temperature and/or a urea concentration of the reductant.

In particular, the ECU may be configured to use a first pressure threshold that increases with increasing urea concentration and/or decreases with increasing temperature.

The invention claimed is:

1. A reductant dosing system for an SCR catalyst comprising:
   an injector,
   a storage tank,
   a reductant pump arranged in a first fluid line between the storage tank and the injector for pumping reductant from the storage tank to the injector,
   a compressor supplying compressed air to the storage tank, and
   an electronic control unit (ECU) configured to control the compressor to provide compressed air to the storage tank to reach a pressure threshold within the storage tank, the ECU configured to determine the pressure threshold based on at least one parameter including urea concentration, and the pressure threshold is determined to prevent cavitation of the reductant within a suction line of the reductant pump.

2. The reductant dosing system according to claim 1, wherein the reductant pump is configured to cool the injector by generating a reductant flow through the injector, wherein a first part of the reductant flow is injected by the injector into the exhaust gas stream and a second part of the reductant flow is flowing back via a second fluid line to the storage tank and/or a suction side of the reductant pump.

3. The reductant dosing system according to claim 2, wherein the second fluid line comprises a cooler.

4. The reductant dosing system according to claim 1, comprising a pressure sensor for sensing a pressure in the storage tank and the ECU controlling the compressor in dependence on a pressure measured by the sensor.

5. The reductant dosing system according to claim 1, configured to maintain an absolute pressure in the storage tank of between 0.5 bar and 2 bar.

6. The reductant dosing system according to claim 5, configured to maintain an absolute pressure in the storage tank of between 0.8 bar and 1.5 bar or 0.9 bar and 1.2 bar.

7. The reductant dosing system according to claim 1, comprising a temperature sensor for sensing a temperature of the reductant stored in the storage tank and the ECU determining the threshold based on an output of the temperature sensor.

8. The reductant dosing system according to claim 1, wherein the ECU determines the threshold based on an output of a sensor for measuring a temperature and/or a urea concentration of the reductant.

9. The reductant dosing system according to claim 8, wherein the compressor is activated if the pressure inside the storage tank and/or atmospheric pressure drops below the pressure threshold.

10. The reductant dosing system according to claim 1, wherein the compressor is an air supply device configured to supply pressurized air to the storage tank.

11. The reductant dosing system according to claim 10, wherein the storage tank comprises an air inlet arranged above the fluid level of the reductant that is connected to the compressor, and/or wherein the compressor, is a turbocharger or an air klaxon.

12. The reductant dosing system according to claim 1, comprising a valve for selectively connecting the storage tank with the compressor and atmosphere, and the ECU controlling the valve to connect the compressor to the storage tank to pressurize the tank to the pressure threshold in response to a determination of risk of cavitation.

13. The reductant dosing system according to claim 12, wherein the ECU controls the valve in dependence on at least one operating parameter, selected from a temperature and/or pressure and/or urea concentration inside the storage tank.

14. The reductant dosing system according to claim 1, configured for purging the dosing system on shut-off of the engine and for refilling the dosing system on start of the engine, wherein the purging is done by operating the reductant pump in a reverse direction.

15. The reductant dosing system according to claim 1, wherein the injector is of the airless type.

16. A combustion engine comprising an exhaust gas aftertreatment system and the reductant dosing system according to claim 1.

17. A mobile machine comprising a combustion engine according to claim 16, wherein the mobile machine is an earth moving machine, a dumper truck, or an excavator.

18. The mobile machine according to claim 17, wherein the compressor provides pressurized air to a functional element of the mobile machine.

19. A reductant dosing system for an SCR catalyst, comprising:
    an injector,
    a storage tank,
    a reductant pump arranged in a first fluid line between the storage tank and the injector for pumping reductant from the storage tank to the injector,
    a compressor supplying compressed air to the storage tank,
    a quality sensor for sensing a urea concentration of the reductant stored in the storage tank, and
    an electronic control unit (ECU) configured to control the compressor to provide compressed air to the storage tank to increase a pressure inside the storage tank a control system for controlling the pressurizing means in dependence on the urea concentration measured by the quality sensor.

20. A reductant dosing system for an SCR catalyst onboard a vehicle, comprising:
    an injector,
    a storage tank,
    a reductant pump arranged in a first fluid line between the storage tank and the injector for pumping reductant from the storage tank to the injector,
    a compressor supplying compressed air to the storage tank,
    a position sensor determining a vehicle position signal indicative of an altitude of the vehicle,
    a quality sensor for sensing a urea concentration of the reductant stored in the storage tank, and
    an electronic control unit (ECU) configured to control the compressor in dependence on the altitude and the urea concentration.

21. The reductant dosing system according to claim 20, wherein the position sensor is a GPS sensor.

* * * * *